United States Patent
Emeneth et al.

(10) Patent No.: US 6,418,814 B1
(45) Date of Patent: Jul. 16, 2002

(54) STEERING WHEEL WITH AT LEAST ONE COVERING ELEMENT

(75) Inventors: Jakob Emeneth, Goldbach; Benno Rosenberger; Karl-Walter Hock, both of Mömbris, all of (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/355,382
(22) PCT Filed: Jan. 29, 1998
(86) PCT No.: PCT/DE98/00321
§ 371 (c)(1),
(2), (4) Date: Jul. 26, 1999
(87) PCT Pub. No.: WO98/33693
PCT Pub. Date: Aug. 6, 1998

(30) Foreign Application Priority Data

Jan. 29, 1997 (DE) .......................... 297 02 241

(51) Int. Cl.[7] ............................ B62D 1/04; G05G 1/10
(52) U.S. Cl. ..................... 74/552; 74/558; 74/558.5; 74/557; 280/750
(58) Field of Search ...................... 74/552, 558, 558.5, 74/557; 280/750

(56) References Cited

U.S. PATENT DOCUMENTS

| | | | | |
|---|---|---|---|---|
| 2,784,006 A | * | 3/1957 | Dye et al. .................... | 280/750 |
| 2,866,357 A | * | 12/1958 | Houghtaling .................. | 74/552 |
| 2,932,982 A | * | 4/1960 | Enders ......................... | 74/557 |
| 3,476,897 A | * | 11/1969 | Vincent ..................... | 74/552 X |
| 3,576,139 A | | 4/1971 | Conterno ...................... | 74/552 |
| 4,581,954 A | * | 4/1986 | Uchida ..................... | 74/558 X |
| 5,289,736 A | * | 3/1994 | Fujimori ....................... | 74/557 |
| 5,333,897 A | * | 8/1994 | Landis et al. ........... | 280/750 X |

FOREIGN PATENT DOCUMENTS

| | | | | |
|---|---|---|---|---|
| DE | 1912534 | 10/1969 | | |
| DE | 40 39 138 | 2/1992 | | |
| DE | 44 18 960 | 12/1995 | | |
| DE | 297 02 241 | 5/1997 | | |
| JP | 57-178970 | * 11/1982 | .................. | 74/552 |
| JP | 59-79445 | 5/1984 | | |
| JP | 60-151173 | * 8/1985 | .................. | 74/558 |
| JP | 62-139776 | 9/1987 | | |
| JP | 3-71970 | 7/1991 | | |
| JP | 5-105085 | * 4/1993 | .................. | 74/552 |

* cited by examiner

Primary Examiner—David A. Bucci
Assistant Examiner—Justin Stefanon
(74) Attorney, Agent, or Firm—Foley & Lardner

(57) ABSTRACT

A steering wheel has at least one covering part affixed to a steering wheel rim. At least one mechanical connecting element, in particular a clip-type connecting part, is placed between the steering wheel rim and the covering part.

16 Claims, 5 Drawing Sheets

STEERING WHEEL WITH AT LEAST ONE COVERING ELEMENT

FIELD OF THE INVENTION

The invention relates to a steering wheel having at least one covering part, wherein at least one clip is provided between the steering wheel and the covering part.

BACKGROUND OF THE INVENTION

Steering wheels generally comprise a steering wheel skeleton having a plastic, e.g. polyurethane, casing. In addition, covering parts of a shape-stable material are frequently stuck onto the steering wheel. These covering parts have a decorative function and often have, for example, a visible wooden surface.

The drawback with these covering parts is that the production of the adhesive connection for the covering parts is time-consuming because the steering wheel has to remain in an adhesive device until the adhesive has hardened. Because the steering wheel is exposed to vibrations, it cannot be ruled out that the adhesive connection will become loose.

SUMMARY OF THE INVENTION

The object of the invention is therefore to provide a rapid secure connection between the covering part and the steering wheel.

With a steering wheel having at least one covering part, according to the invention, at least one mechanical connecting element is provided between the steering wheel and the covering part. A clip-like connecting element is preferably provided.

This type of connection has the advantage that the connecting part can be connected to the steering wheel by short-term pressure. In addition, in this case an adhesive joint can also be provided between the covering part and the steering wheel. The mechanical connecting elements ensure the necessary pressure on the covering part so that an adhesive device is no longer necessary.

In a preferred embodiment, it is proposed that clips are fixed on a steering wheel rim, which is the skeleton ring of the steering wheel, and that recesses associated with the clips are provided on the covering part so that the clips can be pressed into the recesses. The clips are preferably designed so that they engage partially around the steering wheel rim and that they have in the area associated with the recesses on the covering part, sections that are bent outwards at least in part. These bent sections increase the secure hold of the clips in the recesses of the covering part.

A further design proposes that the bent sections have points running symmetrical relative to each other.

The clips or mechanical connecting elements preferably extend into the lower part of the steering wheel casing and/or the casing engages at the top around the clips, at least in part. To this end, the connecting elements are preferably fitted onto the steering wheel rim before fitting the casing on the steering wheel rim so that the connecting elements are fixedly connected to the casing when it is fitted It is further expedient if the clips have outwardly bent ends in a lower part of the clips. An even better adhesion of the clips in the casing can thereby be achieved.

With a further embodiment, the clip-like connecting part is mounted next to the steering wheel rim and the covering part has at least one clasp that engages over the clip-like connecting part. Because the clip-like connecting part is mounted next to the steering wheel rim, it is also readily possible to fix the covering part on the steering wheel rim, which covering part runs on only one side on the steering wheel rim.

In a preferred design of this embodiment, the clip-like connecting part is mounted on a centering plate fixed in the steering wheel casing and/or on the steering wheel rim. The clip-like connecting part, thereby, has on one side, bent-up sections acting opposite the centering plate and on the other side further bent-up sections acting opposite the clasp.

The clasp is deformable in the area of the clip-like connecting part and/or has openings for engaging the bent-up sections. The centering plate likewise has openings for engagement of the bent-up sections.

In one embodiment the clasp is made of wood and has an insert of plastic for engaging the clip-like connecting part.

BRIEF DESCRIPTION OF THE DRAWINGS

The invention will now be explained with reference to the embodiments shown in the drawings in which.

DETAILED DESCRIPTION OF THE PREFERRED EMBODIMENTS

Figure 1:
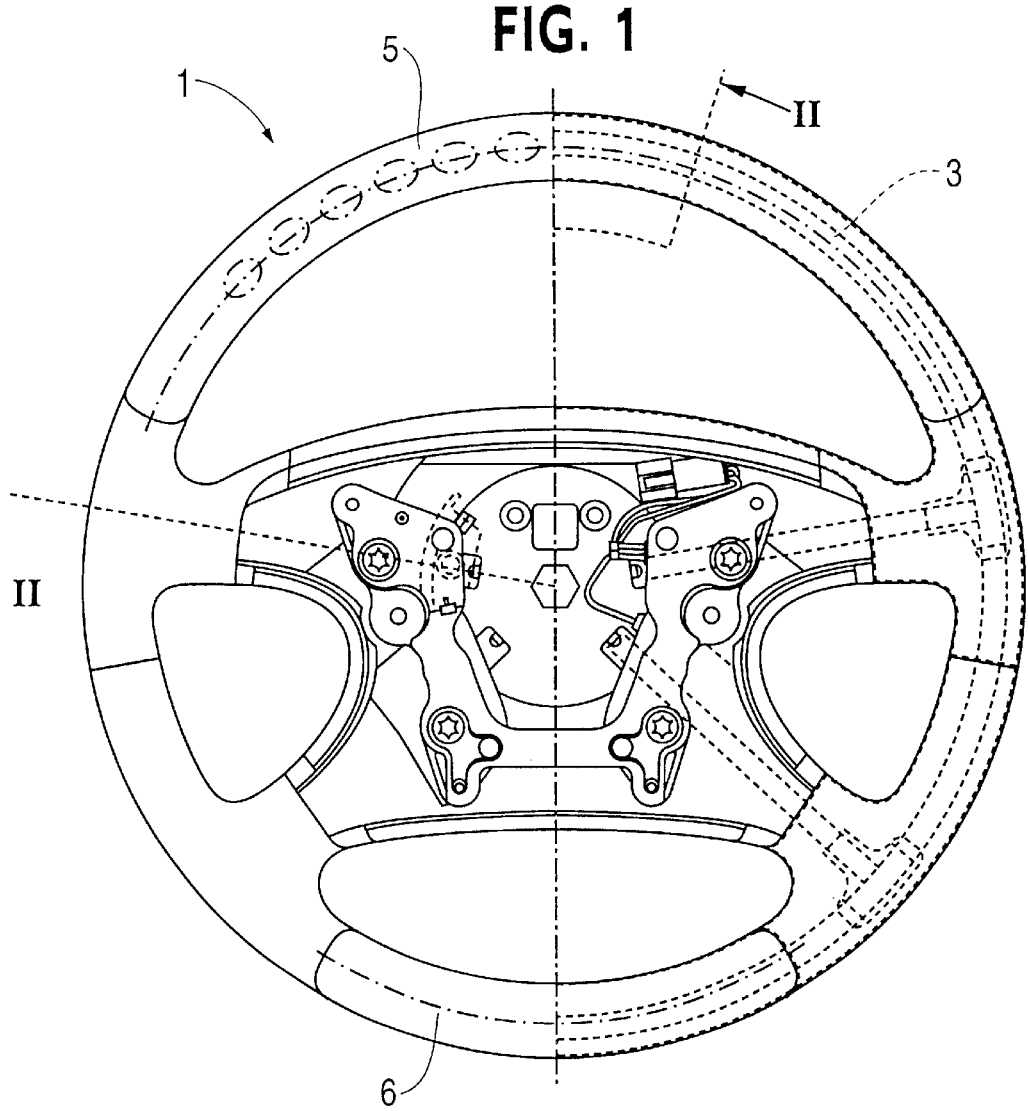
FIG. 1 is a plan view of a steering wheel.
Figure 2:
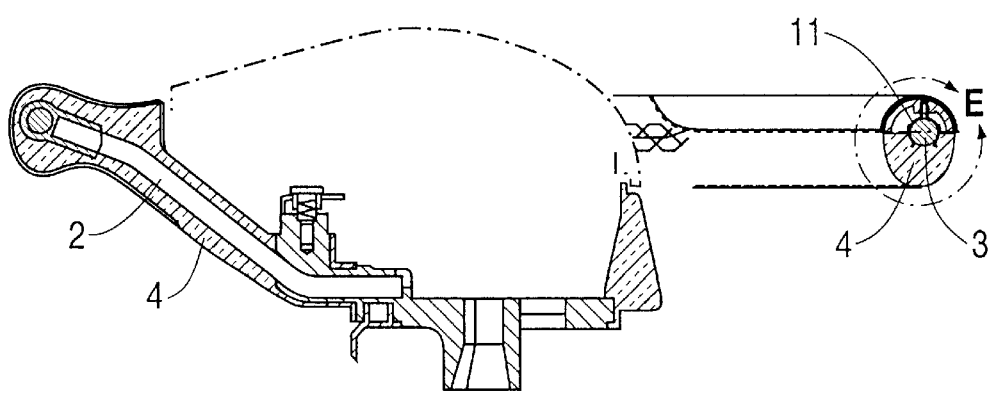
FIG. 2 is a sectional view II—II through the steering wheel according to FIG. 1.

A steering wheel 1 has, as the essential constituent parts, a steering wheel rim 3 connected to spokes 2. The rim 3 and spokes 2 are enclosed by a casing 4 comprised preferably of PUR foam. The steering wheel is provided on its top side with covering parts 5,6. The covering parts do not extend over the entire top side of the steering wheel but are arranged as segments. The covering part 5 is longer than the covering part 6. As can be seen from FIGS. 3 and 4, the covering parts consist of a pressure-cast aluminum support 7 onto which a wooden coating is applied. This wooden coating comprises an under (bottom) veneer 8 and a top veneer 9 sealed with a polyester layer 10. The support 7 comprises at least one recess 14.

Figure 3:
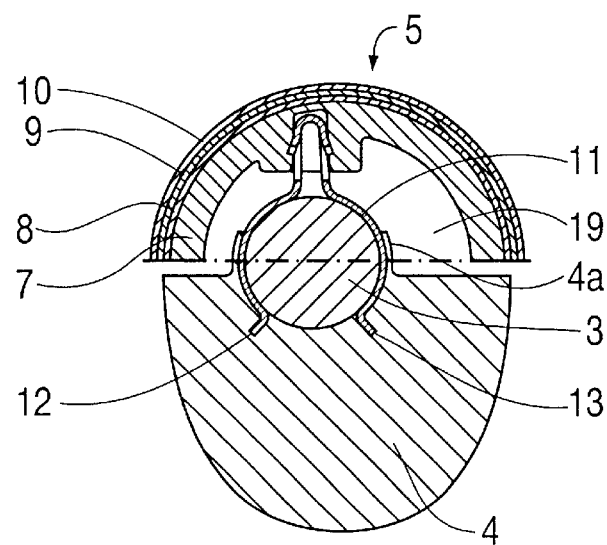
FIG. 3 shows on an enlarged scale a detail E of FIG. 2.
Figure 4:
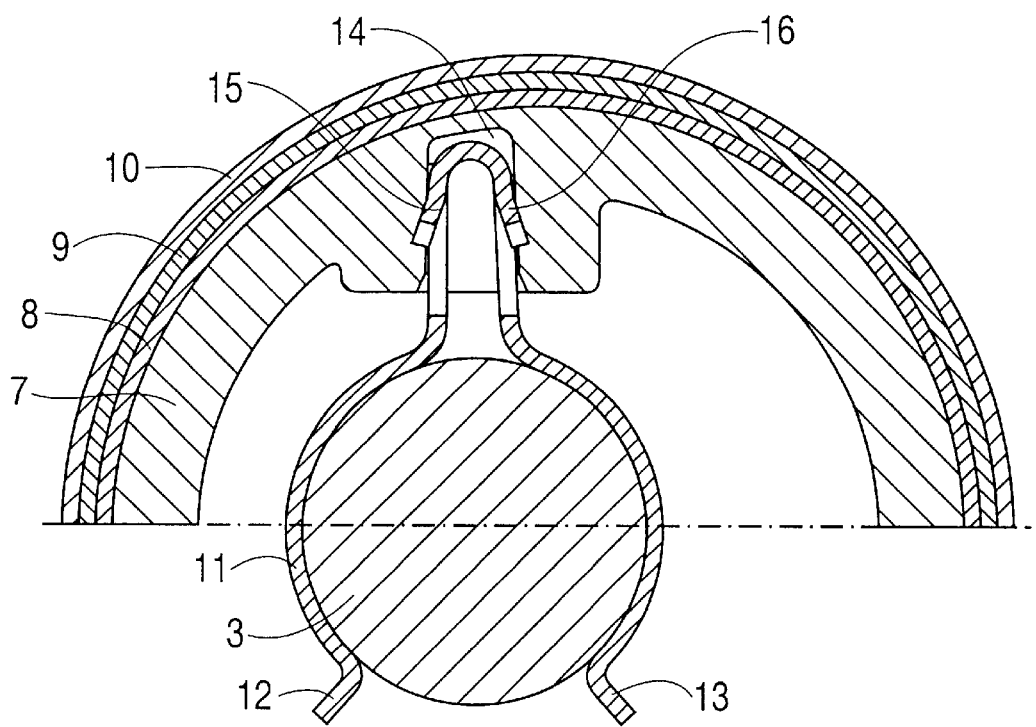
FIG. 4 shows, on an enlarged scale, the upper area of FIG. 3.
Figure 5:
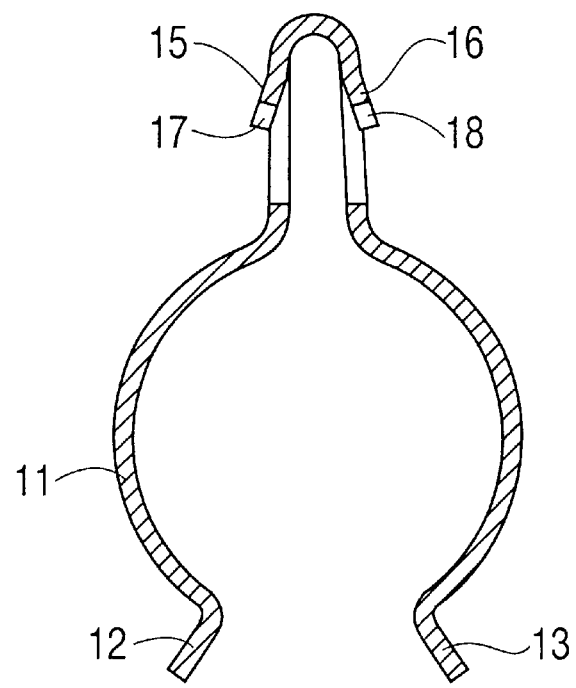
FIG. 5 shows a cross-sectional view through a clip.

Several clips (clip-like connecting elements) 11 are arranged on the steering rim 3. The number of clips depends on the length of the covering part. Thus, in this embodiment, the covering part 5 is allocated four clips and the covering part 6 three clips (not shown). FIGS. 3 to 5 show that the clips have, in the area of the steering rim 3, a cross-section matching the circular cross-section of the insert, so that the clips partially engage around the steering rim and are anchored thereto. When they are fitted onto the steering rim, the clips are elastically bent up and then fit close against the steering rim. The clips have, in a lower part outwardly bent ends 12, 13. These ends project into the casing 4 and ensure an extra firm seat for the clips. In addition, the casing 4 engages around the clips 11 by a section 4*a* located at the top of the casing.

Figure 6:
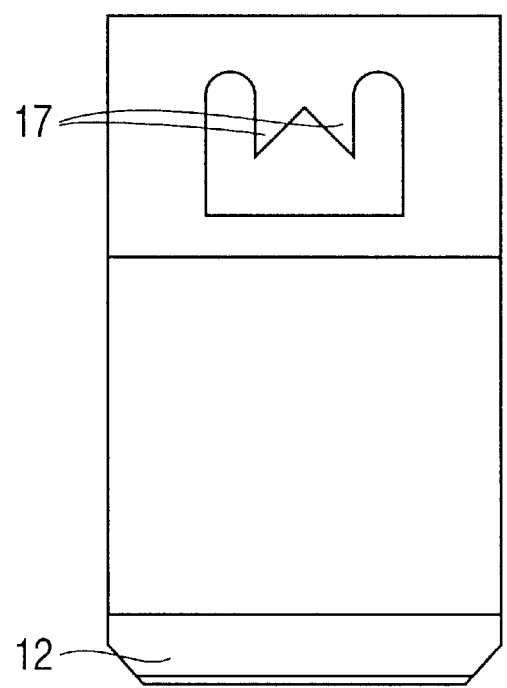
FIG. 6 shows a side view of a clip.

In the area above the steering rim 3, each clip is adapted in its cross-section to the cross-section of each recess 14 in the support 7 into which the clip is pressed. It can be seen, in particular, from FIGS. 5 and 6 that the clips have, in this area, sections 15,16 that are bent out at least in part. The bent sections have tips 17,18 running symmetrical relative to each other. The sections thus formed ensure, in addition, a fixed connection between the support 7 and the clips 11.

In addition to the mechanical fastening, the support 7 and the casing 4 can be stuck together. A space 19 is thereby filled with adhesive. It can be seen from FIG. 3 that the casing 4 is narrower than the covering part 5 so that the casing can still be encased by a further layer, e.g. with a circumferential leather cover (not shown) so that the casing 4 then has the same width as the covering part 5.

Figure 7:
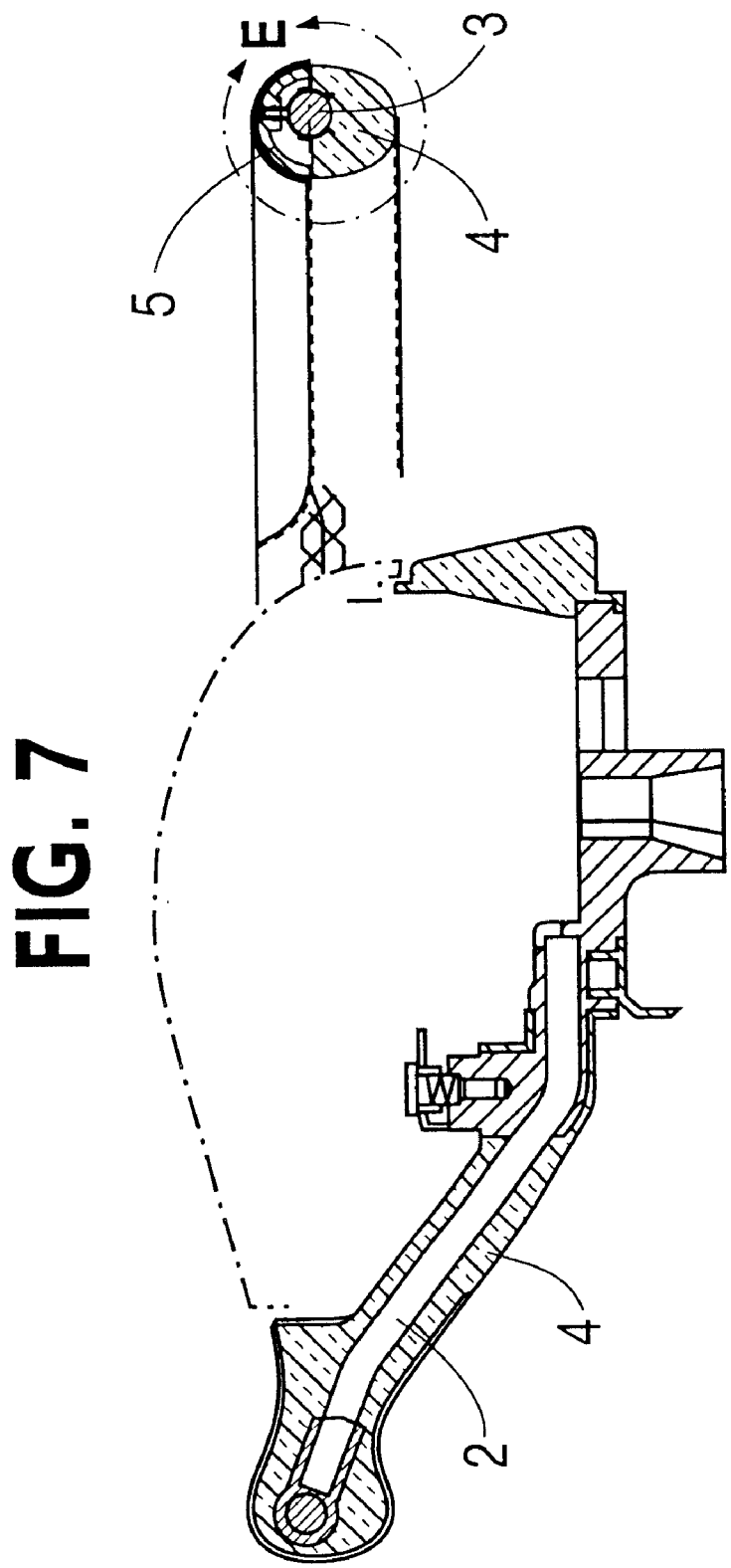
FIG. 7 shows a section II—II through a second embodiment of the steering wheel according to FIG. 1.
Figure 8:
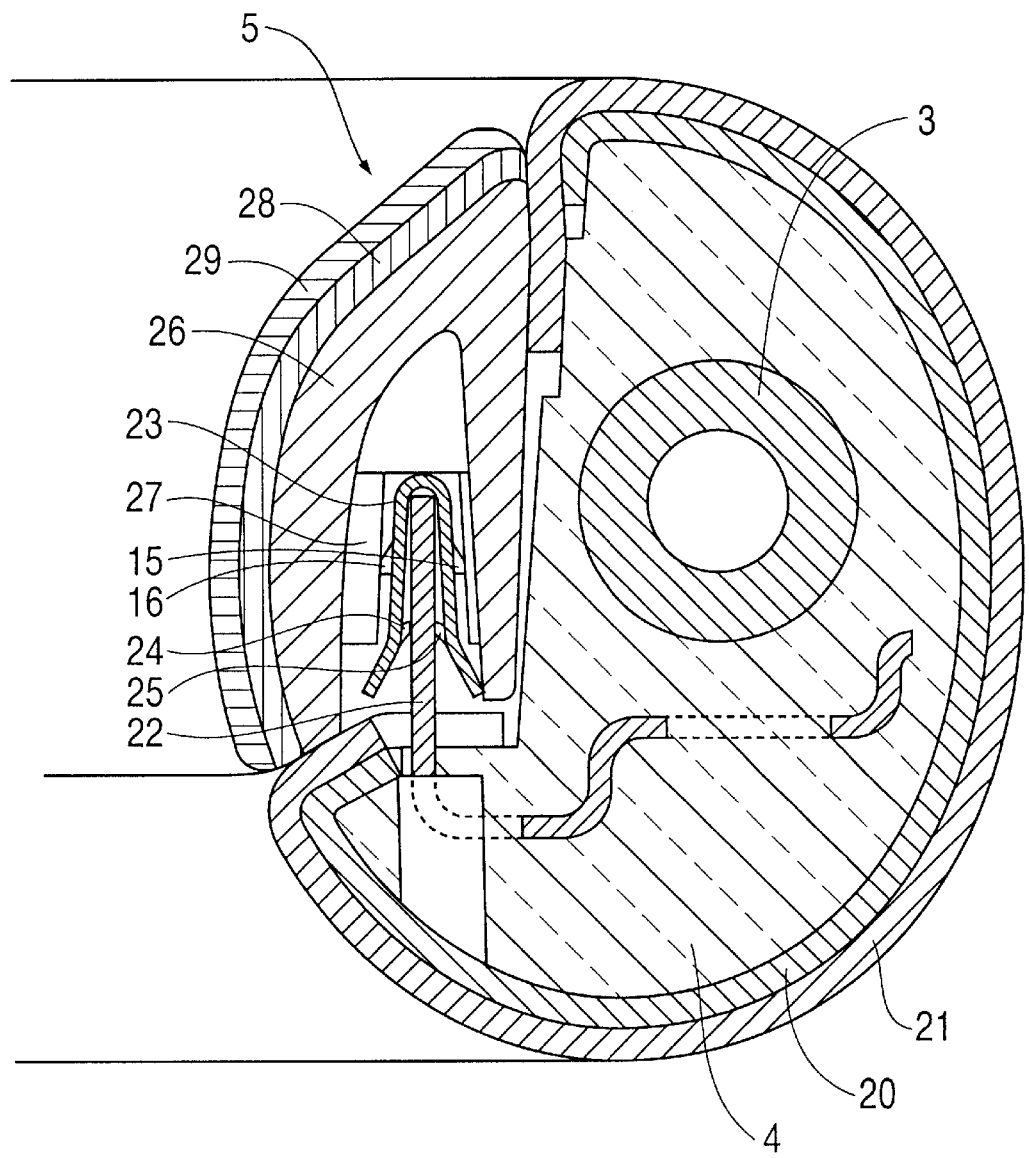
FIG. 8 shows, on an enlarged scale, a detail E according to FIG. 7.

FIG. 7 shows an embodiment having a cover (covering part) 5 mounted on one side. It can be seen from the enlarged view of the steering wheel rim 3 in FIG. 8 that the casing 4 is covered with soft foam 20, which is trimmed with leather 21. In the view of the steering wheel rim, a free standing centering plate 22 is arranged on the left next to the steering wheel rim 3 and is fixed in the casing 4. This centering plate serves to fix the covering part 5. For this affixation, clips 23 are provided on the centering plate 22 and have bent sections 24, 25 by means of which the clips are held on the centering plate 22.

The covering part 5 consists of a clasp 26 which is provided with a plastic insert 27. The plastic insert 27 is associated with the bent sections 15, 16 of the clips 23 which, during fitting of the clasp 26, press into the plastic insert or engage in openings (not shown) of the plastic insert 27, whereby the covering part 5 is fixed on the steering wheel. The covering part is generally to have a wooden structure. The clasp 26 is therefore trimmed with an under (bottom) veneer 28 and a top veneer 29 sealed by a polyester layer (not shown). It is however also possible to make the clasp from a wood whose surface is to be visible and to treat the surface so that no veneer is necessary.

What is claimed is:

1. A steering wheel comprising:
    a steering wheel rim;
    at least one covering part fixed to and partly covering the steering wheel rim along a circumference thereof, the covering part having at least one recess; and
    at least one clip connecting the steering wheel rim and the covering part;
    wherein a portion of the clip is seated in the recess;
    wherein the portion of clip seated in the recess of the covering part has bent-up sections, which are bent at least partially outwardly and contact inner surfaces of the recess.

2. The steering wheel according to claim 1, including a plurality of clips and recesses seating the clips.

3. The steering wheel according to claim 2, wherein each of the clips engages at least partially around the steering wheel rim.

4. The steering wheel according to claim 3, wherein the bent-up sections of each of the clips have at least two opposingly facing points.

5. The steering wheel according to one of the preceding claims, wherein each clip has a lower part and an outwardly bent down end in the lower part.

6. A steering wheel comprising:
    a steering wheel rim;
    at least one covering part fixed to the steering wheel rim, the covering part having at least one recess;
    at least one clip connecting the steering wheel rim and the covering part; and
    a steering wheel casing,
    wherein the clip extends into a top part of the steering wheel casing and the top part engages at least partially around the clip,
    wherein a portion of the clip is seated in the recess, and
    wherein the portion of clip seated in the recess of the covering part has bent-up sections, which are bent at least partially outwardly.

7. A steering wheel comprising:
    a steering wheel rim;
    at least one covering part fixed to the steering wheel rim, the covering part having at least one recess;
    at least one clip connecting the steering wheel rim and the covering part; and
    a casing connected to the steering wheel rim,
    wherein at least one adhesive spot is provided between the covering part and the casing,
    wherein a portion of the clip is seated in the recess;
    wherein the portion of clip seated in the recess of the covering part has bent-up sections, which are bent at least partially outwardly.

8. The steering wheel according to claim 1, wherein the clip is mounted beside the steering wheel rim and the covering part has at least one clasp engaging over the clip.

9. The steering wheel according to claim 8, further comprising a centering plate fixed in the steering wheel casing, wherein the clip is engaged over a portion of the centering plate.

10. The steering wheel according to claim 9, wherein the clip has a first side and a second side, wherein the bent-up sections include first bent-up sections engaging against the centering plate on the first side and second bent-up sections engaging against the clasp on the second side.

11. The steering wheel according to claim 10, wherein the clasp has one of a deformable area at least in the area of the clip engagement and openings for accommodating the second bent-up sections; and wherein the centering plate has openings for accommodating the first bent-up sections.

12. The steering wheel according to claim 8, wherein the clasp is made of wood.

13. The steering wheel according to claim 12, wherein the clasp has a plastic insert for engaging the clip.

14. A steering wheel comprising:
    a steering wheel rim;
    at least one covering part extending only partly around a circumference of the steering wheel rim, the covering part having a recess; and
    a clip attached to the steering wheel rim and the covering part, the clip having a closed end and an open end defined by spaced apart clip arms extending from the closed end,
    wherein the closed end of the clip is located in the recess, and
    wherein the clip arms have a cross-section matching a cross-section of the steering wheel rim so that the clip arms partially engage around the steering wheel rim and are anchored on the rim.

15. A steering wheel comprising:
    a steering wheel rim;
    at least one covering part fixed to and partly covering the steering wheel rim along a circumference thereof, the covering part having at least one recess; and
    at least one clip connecting the steering wheel rim and the covering part,
    wherein a portion of the clip is seated in the recess, wherein the portion of clip seated in the recess of the covering part has bent-up sections, which are bent at least partially outwardly, and wherein the covering part is spaced from the steering wheel rim so that the covering part is suspended therefrom.

16. A steering wheel comprising:

a steering wheel rim;

at least one covering part extending only partly around a circumference of the steering wheel rim, the covering part having a recess; and a clip attached to the steering wheel rim and the covering part, the clip having a closed end and an open end defined by spaced apart clip arms extending from the closed end, wherein the closed end of the clip is located in the recess, and wherein the covering part is spaced from the steering wheel rim so that the covering part is suspended therefrom.

* * * * *